United States Patent
Curtis

(10) Patent No.: US 8,167,763 B2
(45) Date of Patent: May 1, 2012

(54) BLOCK MOUNTED LOCK-OUT MECHANISM

(75) Inventor: Kent M. Curtis, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 421 days.

(21) Appl. No.: 12/426,422

(22) Filed: Apr. 20, 2009

(65) Prior Publication Data
US 2010/0267512 A1    Oct. 21, 2010

(51) Int. Cl.
F16H 48/20    (2012.01)
(52) U.S. Cl. ........................................ 475/231
(58) Field of Classification Search ............. 192/54.5, 192/105 CP; 475/231, 232, 233, 234, 235, 475/236, 238, 239, 240, 220, 221, 230, 248, 475/249, 273
See application file for complete search history.

(56) References Cited

U.S. PATENT DOCUMENTS

| | | | | |
|---|---|---|---|---|
| 2,501,956 | A | * | 3/1950 | Misener ..................... 475/233 |
| 3,133,454 | A | * | 5/1964 | Padlo ........................ 475/150 |
| 3,606,803 | A | | 9/1971 | Ottemann |
| 3,893,351 | A | | 7/1975 | Baremor |
| 4,266,445 | A | * | 5/1981 | Goscenski, Jr. ............ 475/232 |
| 5,484,347 | A | | 1/1996 | Holmquist |
| 6,254,505 | B1 | * | 7/2001 | Forrest ....................... 475/230 |
| 6,319,166 | B1 | * | 11/2001 | Kyle et al. .................. 475/232 |
| 6,688,194 | B2 | | 2/2004 | Dissett et al. |
| 7,361,116 | B2 | * | 4/2008 | Kyle et al. .................. 475/232 |
| 7,438,661 | B2 | * | 10/2008 | Kyle et al. .................. 475/232 |
| 7,866,433 | B2 | * | 1/2011 | Martin et al. ............... 180/337 |
| 2003/0040390 | A1 | | 2/2003 | Forrest et al. |
| 2003/0199359 | A1 | | 10/2003 | Tucker-Peake |

FOREIGN PATENT DOCUMENTS

EP    1156233 A2    11/2001
WO    2007093894 A2    8/2007

OTHER PUBLICATIONS

European Patent Office; International Search Report and Written Opinion of the International Searching Authority issued in the corresponding PCT Application No. PCT/IP2010/000855. Date of Mailing: Jul. 28, 2010.

* cited by examiner

*Primary Examiner* — David D Le
*Assistant Examiner* — Michael Gonzalez
(74) *Attorney, Agent, or Firm* — Dykema Gossett PLLC

(57) ABSTRACT

A differential is provided that includes a first and second side gear and a reaction block disposed between the first and second side gear. The differential further includes an engagement mechanism configured to have at least a portion of the engagement mechanism that is moveable from a retracted position to an extended position and a lock-out mechanism that is configured to engage the portion of the engagement mechanism. The lock-out mechanism is mounted to the reaction block. A reaction block for a differential in which a lock-out mechanism is mounted on the reaction block is also provided.

17 Claims, 3 Drawing Sheets

BLOCK MOUNTED LOCK-OUT MECHANISM

TECHNICAL FIELD

The present invention relates to a block mounted lock-out mechanism, including a block mounted lock-out mechanism for a differential.

BACKGROUND

One type of differential gear mechanism may commonly be referred to as a "locking differential." In particular, one type of locking differential may be referred to as a "mechanical locker" (i.e., a locking differential in which the locking function occurs in response to the operation of a mechanical device, as opposed to hydraulic actuation or electromagnetic actuation). A conventional locking differential may utilize a lockout mechanism (e.g., flyweight mechanism) to initiate the lock-up of the differential clutch, wherein the lock-out mechanism is configured to retard rotation of the cam plate relative to the differential input (e.g., the ring gear and the differential case). Locking differentials that utilize a lock-out mechanism to initiate clutch engagement may be made in accordance with the teachings of any one or more of U.S. Pat. Nos. 3,606,803; 5,484,347, and 6,319,166, all of which are assigned to the assignee of the present invention and incorporated herein by reference. Although these patents have been incorporated by reference, the present invention is not limited to only those locking differentials that are made in accordance with the teachings of the referenced patents.

Conventionally, the lock-out mechanism may be mounted on the differential case. While case-mounted lock-out mechanisms have been in widespread commercial usage and provide sufficient performance characteristics, it may be desirable to avoid mounting the lock-out mechanism on the differential case. For example, the conventional case-mounting of the lock-out mechanism requires a bushing and associated drilling operation that increases complexity and cost of production. Second, increased capitalization is required for machining and assembling the differential case to be configured to receive the lock-out mechanism.

SUMMARY

A differential is provided that includes a first and second side gear and a reaction block disposed between the first and second side gear. The differential further includes an engagement mechanism configured to have at least a portion of the engagement mechanism that is moveable from a retracted position to an extended position and a lock-out mechanism that is configured to engage the portion of the engagement mechanism. The lock-out mechanism is mounted to the reaction block.

A reaction block for a differential is also provided that includes an engagement mechanism and a lock-out mechanism, in which the lock-out mechanism is mounted on the reaction block. The engagement mechanism comprises at least one flyweight member configured to extend outwardly when a predetermined amount of differentiating action is provided, and the lock-out mechanism comprises a pawl configured to receive the at least one flyweight member and at least partially control movement of the engagement mechanism.

A differential with a block mounted lock-out mechanism (e.g., a lockout mechanism mounted to the reaction block) in accordance with the present invention may eliminate the conventional bushing and associated drilling operation required for case-mounting of the lock-out mechanism and may make machining and assembly of the differential case less complex and costly.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
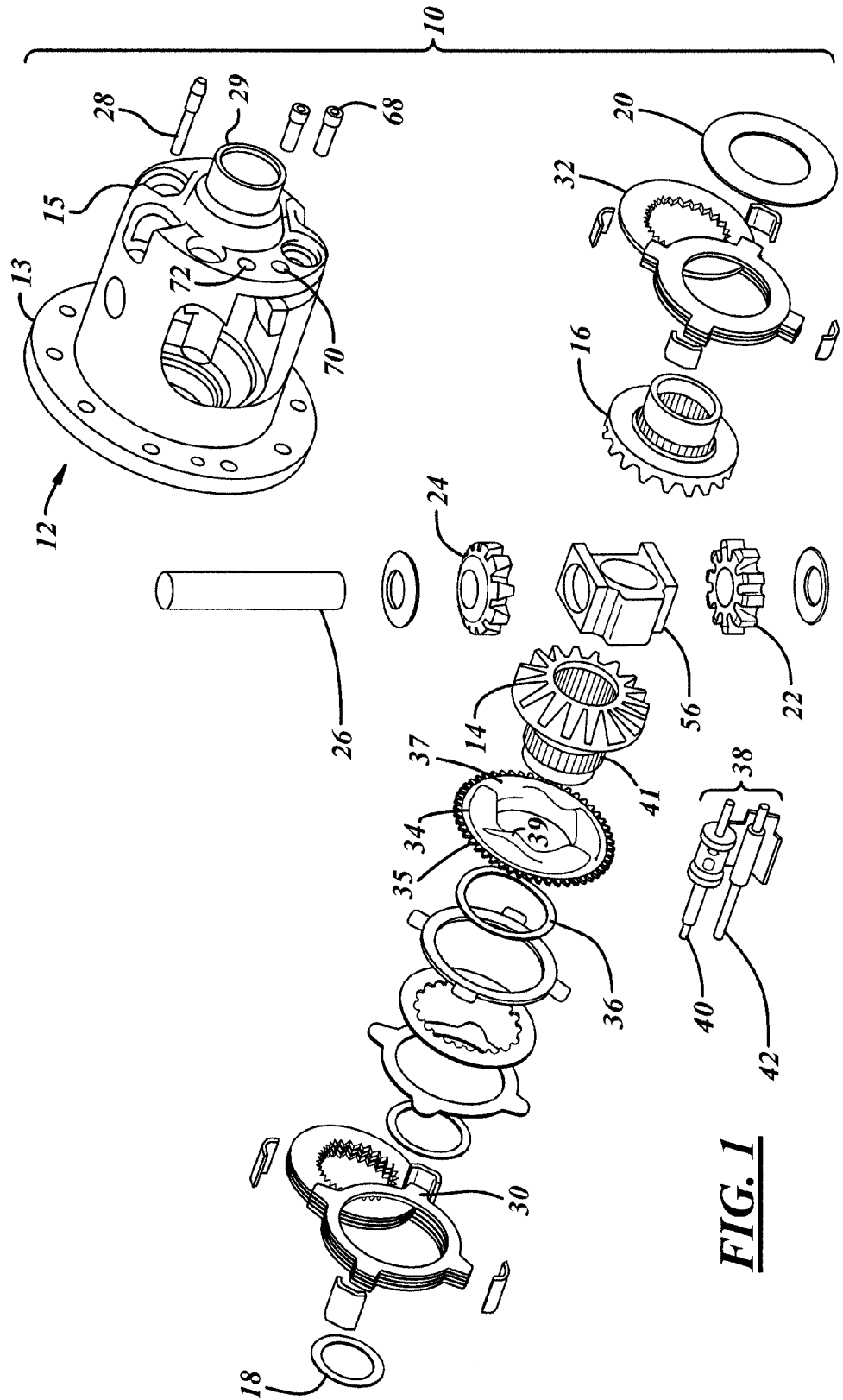
FIG. 1 is an exploded view of a mechanical locking differential.

FIG. 1 is an exploded view of a mechanical locking differential 10 that generally exhibits certain operations, features, and/or teachings known to those of skill in the art. Differential 10 is configured to allow two wheels on a motor vehicle to operate at different speeds and maintain free differential action. However, if one wheel begins to slip, the drive axle may be automatically and fully locked side to side, thereby providing full power to both wheels. Differential 10 includes a case 12. Case 12 may include a first end (e.g., flange end) 13 and a second opposing end (e.g., bell end 15). Case 12 may be configured to define a gear chamber and house various other components of differential 10. Torque input to differential 10 may be by means of an input gear (e.g., ring gear) (not shown). The input gear may be attached to case 12 by any means conventional in the art, including, but not limited to a plurality of bolts. The input gear (e.g., ring gear) may be in toothed engagement with an input pinion gear (not shown), which receives input drive torque from the vehicle driveline.

Differential 10 may further include a differential gear set disposed within the gear chamber of case 12. In particular, differential 10 may include two side gears 14, 16, thrust shims 18, 20, two pinion gears 22, 24, a pinion shaft (e.g., cross-shaft) 26, and a pinion shaft lock screw 28. The pinions gears 22, 24 may be rotatably mounted on the pinion shaft 26. The pinion shaft 26 may be connected to case 12 by any means conventional in the art. The pinion gears 22, 24 may comprise the input gears of the differential gear set disposed within the gear chamber of case 12. The pinion gears 22, 24 may be in meshing engagement with side gears 14, 16. The side gears 14, 16 comprise the output gears of the differential gear set disposed within the gear chamber of case 12. The side gears 14, 16 may be in splined engagement with a pair of axle shafts (not shown) of a motor vehicle, for example. Case 12 may include annular hub portions 29 on opposing ends of case 12 that are configured to surround the axle shafts. Typically, bearing sets (not shown) are mounted on the hub portions 29 to provide rotational support for the differential gear mechanism.

During normal, straight-ahead operation of the vehicle, there may be limited differentiating action (e.g., substantially no differentiating action) that may occur between the left and right axle shafts, and the pinion gears 22, 24 may not rotate relative to the pinion shaft 26. Accordingly, the case 12, the pinion gears 22, 24, the side gears 14, 16, and the axle shafts (not shown) all rotate about an axis of rotation (A) of the axle shafts, as a solid unit. Under certain operating conditions, such as when the vehicle is turning, a certain amount of differentiating action may occur between the side gears 14, 16, up to a predetermined level of speed difference. Above that predetermined level (e.g., above a difference of about 100 RPM between the side gears 14, 16), it may be desirable to retard the relative rotation between each of the side gears 14, 16 and the gear case 12, to prevent excessive differentiating action between the axle shafts.

To retard differentiating action between the axle shafts, the differential 10 may be provided with a lockup means for locking up the differential gear set, and an actuating means for actuating the lockup means. For example, the lockup means may comprise clutch packs 30, 32. Clutch pack 30 may comprise a flange end clutch pack 30 and may be located at the flange end 13 of case 12. Clutch pack 32 may comprise a bell end clutch pack 32 and may be located at the bell end 15 of case 12. As is known in the art, the clutch pack 30 may include a plurality of inner clutch discs and a plurality of outer clutch discs. The inner clutch discs may include radially outwardly extending "ears." The "ears" may fit into guide holes in the differential case 12. Accordingly, the inner clutch discs may turn with the case 12. The outer clutch discs may include splines (e.g., include teeth on the inner radial surface of each of the plurality of outer clutch discs). The splines on the outer clutch discs may be configured for engagement with the external splines of the side gears 14, 16. Accordingly, the outer clutch discs may turn with the axle shafts and/or wheels.

The lockup means may further include a clutch cam plate 34 and a wave spring 36. As is known is the art, the clutch cam plate 34 may be configured to affect movement of the clutch pack 30 from a disengaged condition to an engaged (e.g., "loaded") condition. In the engaged (e.g., "loaded") condition, the clutch pack 30 may be effective to retard relative rotation between the case 12 and the side gear 14, thus retarding and/or minimizing differentiating action between the side gears 14, 16. The clutch cam plate 34 may define a set of external teeth 35 on a radially outwardly extending outer surface. The clutch cam plate 34 may also define a cam surface 37 with a plurality of cam ramps 39. Side gear 14 may also define a cam surface 41 with a plurality of cam ramps and a plurality of detents machined into the cam surface 41 (e.g., the backside of the side gear 14). The cam ramps on side gear 14 may correspond with the cam ramps 39 on clutch cam plate 34. The mating detents on the side gear 14 may prevent the clutch cam plate 34 from ramping until a predetermined torque is applied at the external teeth 35 of the clutch cam plate 34. Accordingly, during normal, straight-ahead operation of the vehicle (e.g., with little or no differentiating action occurring), the cam surface of the side gear 14 and the cam surface 37 of the clutch cam plate 34 remain in a neutral position (i.e., no ramping) with the clutch cam plate 34 rotating with the side gear 14 at the same rotational speed. By retarding rotation of the cam clutch plate 34 (e.g., by application of torque to the external teeth 35 of the clutch cam plate 34) relative to the side gear 14, movement of the clutch pack 30 may be achieved because of the "ramping" of the cam surface of the side gear 14 and the cam surface 37 of the clutch cam plate 34. When the clutch cam plate 34 rotates out of the detents on side gear 14, the cam ramps 39 on the clutch cam plate 34 engage the cam ramps on the backside of side gear 14. As the clutch cam plate 34 continues rotating, it moves axially toward the side gear 14 and applies pressure to the clutch pack 30. Wave spring 36 is configured to apply pressure to the clutch cam plate 34 in order to try to maintain the clutch cam plate 34 in the detent position (i.e., so that the cam ramps 39 on the clutch cam plate 34 and backside of side gear 14 are not engaged). The axial pressure from the axial movement of the clutch cam plate 34 must, therefore, be sufficiently strong to move the clutch cam plate 34 against the pressure applied by the wave spring 36.

Figure 2:
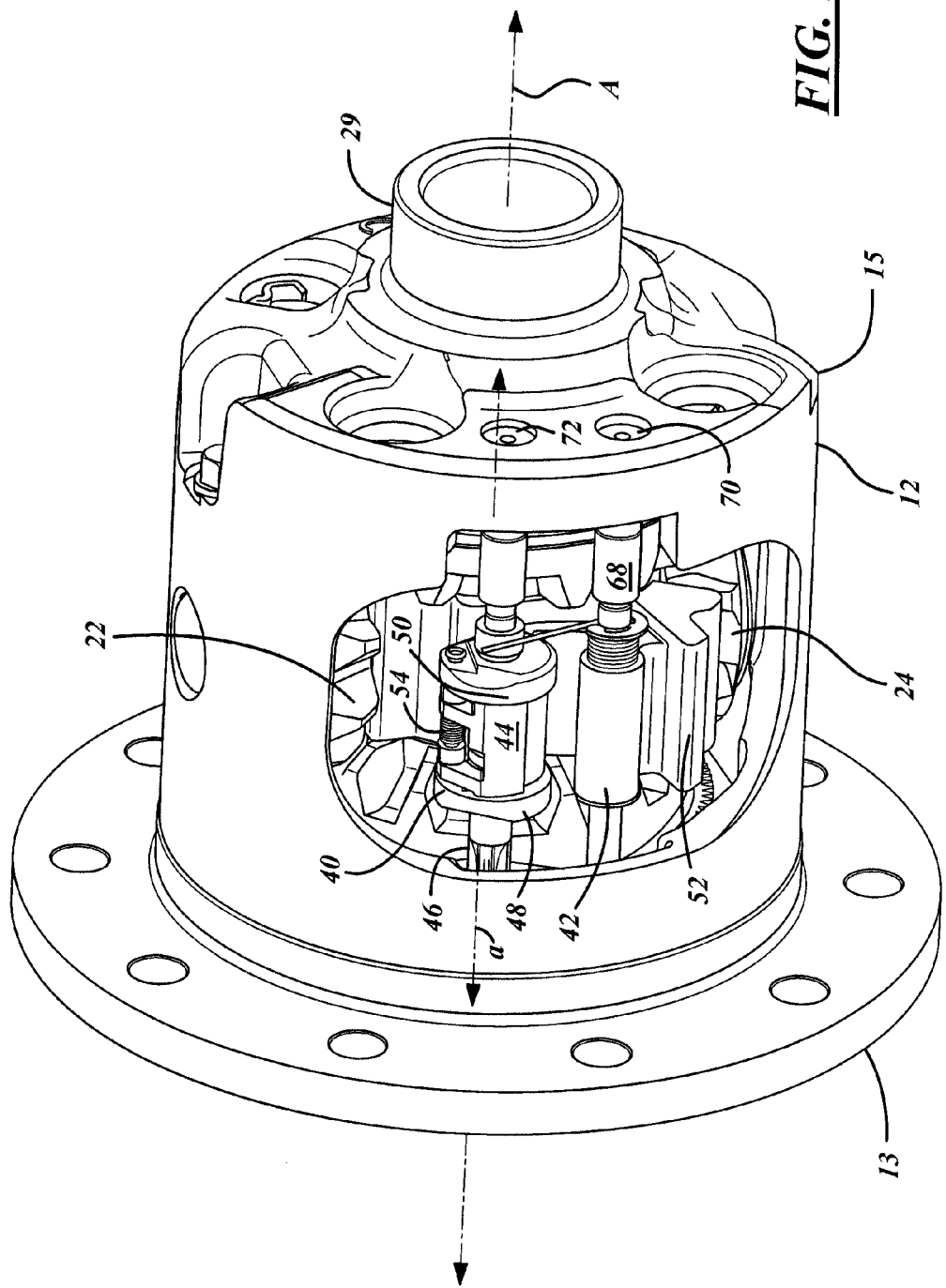
FIG. 2 is a perspective view of the mechanical locking differential of FIG. 1.

An actuating means 38 for actuating the lockup means may be utilized to retard rotation of the clutch cam plate 34 relative to the side gear 14. For example, the actuating means 38 may comprise an engagement mechanism 40 and a lock-out mechanism 42. Referring now to FIG. 2 illustrating an assembled mechanical locking differential, the engagement mechanism 40 may comprise a differential governor. The engagement mechanism 40 may be mounted within the case 12 for rotation about its own axis. The engagement mechanism 40 may include a plurality (e.g., two) spring loaded flyweights 44. The flyweights 44 may comprise cylindrical flyweights. The engagement mechanism 42 may further include an externally geared portion 46, which is in engagement with the external teeth 35 of the clutch cam plate 34. The flyweights 44 may be rotatable about an axis (a) that is oriented generally parallel to the axis of rotation (A). The flyweights 44 may each define a stop surface that is movable from a retracted position to an extended position in response to a predetermined extent of differentiating action. The flyweights 44 may also define a pivot axis (PA) generally parallel to and spaced apart from the axis (a) around which the flyweights 44 are rotatable. The stop surfaces of the flyweights 44 are generally oppositely disposed from the pivot axis (PA).

The flyweights 44 may be coupled to the externally geared portion 46 via end caps 48, 50 that serve as spring-loaded cone clutches to cushion their engagement with lock-out mechanism 42 (e.g., latching bracket). The lock-out mechanism 42 of the actuating means 38 may comprise a latching bracket. The lock-out mechanism 42 (e.g., latching bracket) may include a pawl 52.

During operation, if the differentiating action begins to occur between the axle shafts (e.g., there is a speed differential between the two wheels), the side gear 14 and clutch cam plate 34 may begin to rotate in unison at a speed different than that of the case 12, thereby causing the engagement mechanism 40 to begin to rotate about its axis. As the speed of the rotation of the engagement mechanism 40 increases, centrifugal force may cause the flyweights 44 to move outward. When the speed differential between the wheels is at or above about 100 RPM, there may be enough centrifugal force on the flyweights 44 of the engagement mechanism 40 to overcome a centering spring 54 and open (e.g., move out). The flyweights 44 may move outward until one of the stop surfaces of the flyweights 44 engages pawl 52 on the lock-out mechanism 42 (e.g., latching bracket), preventing further rotation of the engagement mechanism 40. When the engagement mechanism 40 stops rotating, the engagement of the geared portion 46 and the external teeth 35 on the clutch cam plate 34 causes the clutch cam plate 34 to rotate at the same speed as the case 12 (which is different than the speeds of rotation of the side gear 14), resulting in ramping, and initializing engagement of the clutch pack 30. In other words, the stopped flyweight 44 may cause the geared portion 46 to rotate the clutch cam plate 34 out of its detent position, thereby triggering a ramping action and lock-up. When the clutch cam plate 34 is ramped against the side gear 14, the ramping increases until both axles turn at the same speed (e.g., full lock), which may prevent further wheel slip. The differential 10 may unlock at speeds below about 20 mph (e.g., 32 kph) when a slight torque reversal is sensed at under 100 RPM differentiation (e.g., when the vehicle is going straight and there is substantially equal traction side-to-side or there is a slight turning (i.e., differentiating) in the direction opposite the original lock).

The lock-out mechanism 42 (e.g., latching bracket) may have a safety feature that is configured to allow it swing out of the reach of the flyweights 44 of the engagement mechanism 40 at speeds above about 20 mph (e.g., about 32 kph) in order to prevent lock-up from occurring. The safety feature, therefore, allows lockup only at low vehicle speeds since lock-up at higher speeds would have significant adverse effects on steering. A locked differential has a tendency to drive a vehicle straight and resist cornering.

Differential 10 may further include a reaction block or thrust block 56. Reaction block 56 may be configured to provide an axial link between the clutch cam plate 34 as it ramps and begins to move axially toward the opposing side gear 16, in order to apply clutching pressure to the clutch pack 32 located at the bell end 15 of the differential case 12. Force from a side gear 14 may be transferred through the reaction block 56 to the other side gear 16, which transfers the force to the clutch pack 32. Similarly, force from a side gear 16 may be transferred through the reaction block 56 to the other side gear 14, which transfers the force to the clutch pack 30. Accordingly, both side gears 14, 16 may be fully locked to the differential case 12, which may lock both axle shafts and their corresponding wheels and tires together to provide maximum traction. The reaction block 56 may be disposed within case 12 and may include one or more apertures to receive the pinion shaft 26.

Figure 3:
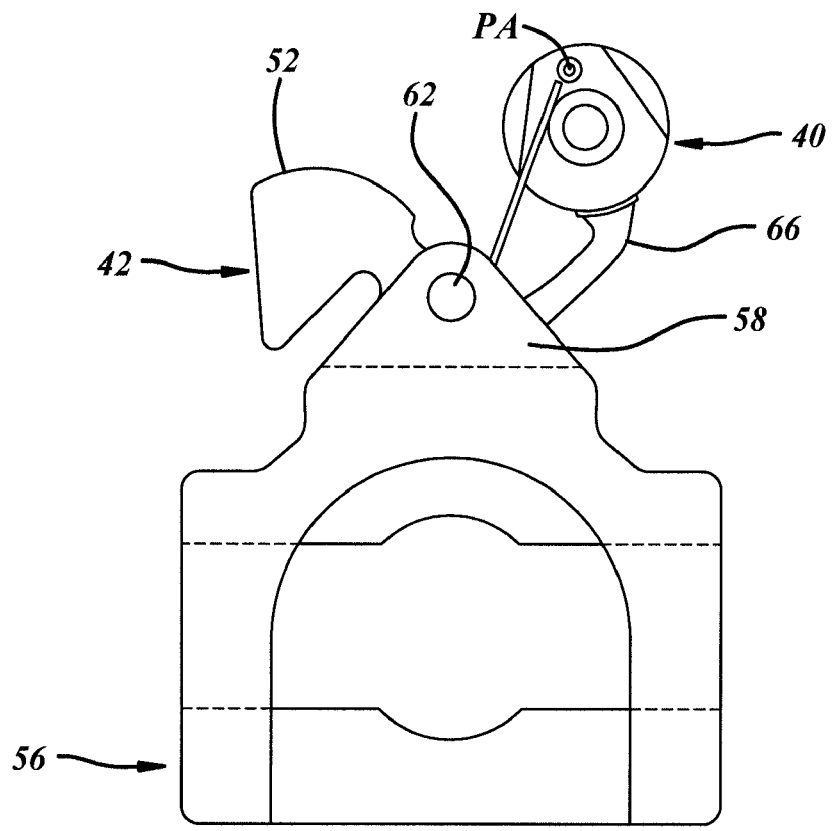
FIG. 3 is a first cross-sectional view of a block mounted lock-out mechanism in accordance with the present invention for use in a mechanical locking differential.
Figure 4:
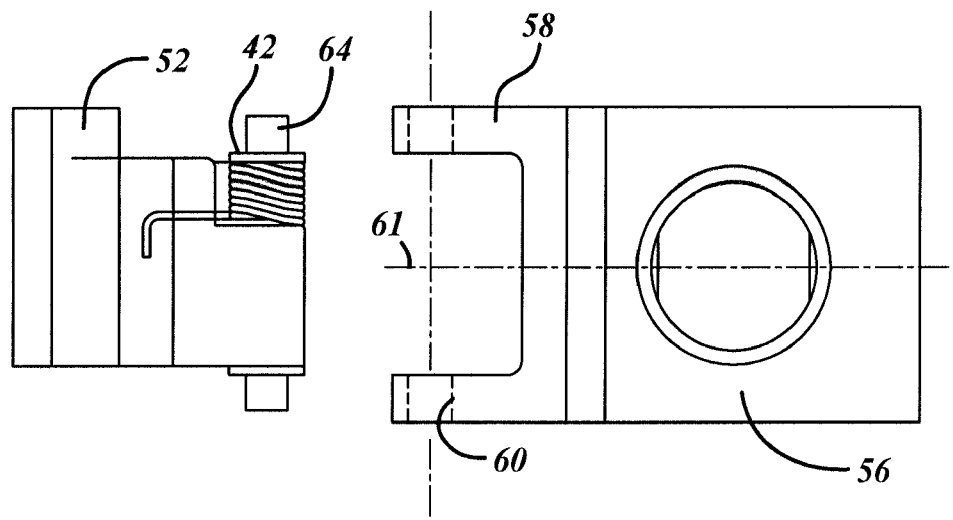
FIG. 4 is a second cross-sectional view of a block mounted lock-out mechanism in accordance with the present invention for use in a mechanical locking differential.

The present invention may be substantially identical and functionally equivalent to the locking differential described herein, except that the actuating means 38 and reaction block 56 may be modified. The actuating means 38 may be mounted to the reaction block 56. Referring now to FIGS. 3-4, a block mounted lock-out mechanism 42 in accordance with teachings of the present invention for use in a mechanical locking differential is illustrated. Reaction block 56 may include one or more projections 58, 60 at one end of reaction block 56. Each of the projections 58, 60 may extend outwardly away from reaction block 56 in the same direction (i.e., be substantially parallel to each other). Referring to FIG. 4, the projections 58, 60 may be oppositely located relative to each other and may include an opening 61 disposed therebetween. Each of the projections 58, 60 may include an aperture 62 (illustrated in FIG. 3). Aperture 62 may be located toward the most outward area of projections 58, 60. For example, projections 58, 60 may have a generally or substantially triangular shape, and an aperture 62 may be located proximate the apex of the triangular shaped projections in an embodiment of the invention. Referring again to FIG. 4, lock-out mechanism 42 may include a shaft 64. Shaft 64 of lock-out mechanism 42 may be configured to be disposed in apertures 62 of projections 58, 60 of reaction block 56. Lock-out mechanism 42 may include pawl 52. The lock-out mechanism 42 may maintain a pivoting relationship with the engagement mechanism 40. Referring now to FIG. 3, engagement mechanism 40 includes an arm 66 configured for connection and/or attachment to lock-out mechanism 42. As described herein, engagement mechanism 40 may be configured for rotation about its own axis and may include a plurality of flyweights that are rotatable and each include a stop surface that is moveable from a retracted position to an extended position for engagement with pawl 52 on lock-out mechanism 42.

Lock-out mechanism 42 is combined (e.g., directly connected) with the reaction block 56 so as to form a single sub-assembly, thereby benefiting the overall assembly process. Lock-out mechanism 42 is not directly connected to and/or mounted to the case 12. The combination of the lock-out mechanism 42 with the reaction block may provide several beneficial improvements. Among other things, the lock-out mechanism 42 mounted on the reaction block 56 can eliminate the necessity of a bushing (e.g., a shaft to case bushing). In contrast, referring now to FIGS. 1-2, bushing 68 is required between the shaft of the lock-out mechanism 42 and the case 12 when the lock-out mechanism 42 is mounted on the case 12. Further, the lock-out mechanism 42 mounted on the reaction block 56 in accordance with the present invention can eliminate the corresponding machined bushing hole 70 in the case 12, as well as other associated assembly and machining labor and tooling. In contrast, referring again to FIGS. 1-2, machined bushing hole 70 is otherwise required for mounting the lock-out mechanism 42 on the case 12. Moreover, the lock-out mechanism 42 in accordance with teachings of the present invention may also eliminate machined holes in the case 12 for supporting the ends of the engagement mechanism 40. In contrast, referring again to FIGS. 1-2, machine holes 72 are otherwise required for mounting the engagement mechanism 40 on the case. Additionally, the lock-out mechanism in accordance with teachings of the present invention may be configured for use with smaller differential applications in which space constraints may be of greater concern.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed is:

1. A differential comprising:
   a first and second side gear;
   a reaction block disposed between the first and second side gear;
   an engagement mechanism configured to have at least a portion of the engagement mechanism moveable from a retracted position to an extended position; and
   a lock-out mechanism configured to engage and at least partially control the movement of the engagement mechanism,
   wherein the lock-out mechanism is mounted to the reaction block.

2. The differential of claim 1, wherein the engagement mechanism comprises a differential governor, and the lock-out mechanism comprises a latching bracket.

3. The differential of claim 1, further comprising a lockup means for the differential, the lockup means comprising a clutch pack and a clutch cam plate, wherein the lockup means is actuated by the engagement mechanism and lock-out mechanism.

4. The differential of claim 3, wherein the clutch cam plate defines a set of external teeth on a radially outward surface and defines a cam surface with a plurality of cam ramps.

5. The differential of claim 4, wherein the side gear defines a cam surface that correspond corresponds to the plurality of cam ramps on the clutch cam plate.

6. The differential of claim 1, wherein the portion of the engagement mechanism moveable from a retracted position to an extended position comprises at least one flyweight.

7. The differential of claim 6, wherein the at least one flyweight is rotatable about an axis that is oriented generally parallel to an axis of rotation of the first and second side gear.

8. The differential of claim 7, wherein a portion of the at least one flyweight is moveable from a retracted position to an extended position in response to a predetermined extent of a differentiating action.

9. The differential of claim 8, wherein the lock-out mechanism includes a pawl.

10. The differential of claim 9, wherein the portion of the at least one flyweight is configured for engagement with the pawl of the lock-out mechanism when the portion of the at least one flyweight is in the extended position.

11. The differential of claim 1, wherein the reaction block is configured to transfer force between the first and second side gears.

12. A differential comprising:
   a case;
   at least one pinion gear disposed in the case;
   a first and second side gear disposed in the case and in meshed engagement with the at least one pinion gear;
   a lockup means operable to retard differential action of the differential;
   an actuating means for actuating the lockup means; and
   a reaction block disposed in the case between the first and second side gears,
   wherein the actuating means comprises an engagement mechanism rotatable about an axis oriented generally parallel to an axis of rotation of the first and second side gear, the engagement mechanism including at least one flyweight, and wherein the actuating means further comprises a lock-out mechanism configured to engage the at least one flyweight of the engagement mechanism when the at least one flyweight is in an extended position, and wherein the lock-out mechanism is mounted on the reaction block.

13. A reaction block for a differential comprising:
   an engagement mechanism comprising at least one flyweight member having a least a portion thereof that is moveable from a retracted position to an extended position; and
   a lock-out mechanism comprising a pawl configured to receive the at least one flyweight member and at least partially control movement of the engagement mechanism,
   wherein the lock-out mechanism is mounted on the reaction block.

14. The reaction block of claim 13, wherein the engagement mechanism includes an arm configured for connecting the engagement mechanism to the lock-out mechanism.

15. The reaction block of claim 13, wherein the lock-out mechanism includes a shaft and the reaction block includes at least one projection having at least one aperture for receiving the shaft of the lock-out mechanism.

16. The reaction block of claim 13, wherein the reaction block includes a plurality of projections configured to support the lock-out mechanism.

17. The reaction block of claim 16, wherein each of the plurality of projections are substantially parallel to each other.

\* \* \* \* \*

UNITED STATES PATENT AND TRADEMARK OFFICE
CERTIFICATE OF CORRECTION

Page 1 of 1

PATENT NO.       : 8,167,763 B2
APPLICATION NO.  : 12/426422
DATED            : May 1, 2012
INVENTOR(S)      : Kent M. Curtis It is certified that error appears in the above-identified patent and that said Letters Patent is hereby corrected as shown below:

Column 7, Line 13 (Claim 5, line 2), delete "correspond"

Column 8, Line 18 (Claim 13, line 3), the first "a" should be -- at --

Signed and Sealed this
Third Day of July, 2012

David J. Kappos
*Director of the United States Patent and Trademark Office*